US006598414B1

(12) United States Patent
Cline

(10) Patent No.: US 6,598,414 B1
(45) Date of Patent: Jul. 29, 2003

(54) OSCILLATING EVAPORATIVE AIR COOLER

(75) Inventor: Ernest E. Cline, Monroe, NC (US)

(73) Assignee: WayCool Acquisition, LLC, Sauk Rapids, MN (US)

( * ) Notice: Subject to any disclaimer, the term of this patent is extended or adjusted under 35 U.S.C. 154(b) by 0 days.

(21) Appl. No.: 09/652,623

(22) Filed: Aug. 31, 2000

(51) Int. Cl.[7] .............................. F28D 5/00; B01D 47/00
(52) U.S. Cl. ............................................ 62/314; 261/106
(58) Field of Search ......................... 62/310, 304, 314, 62/259.4, 91; 261/94, 105, 106, DIG. 3, DIG. 43; 454/285, 286, 287

(56) References Cited

U.S. PATENT DOCUMENTS

| 2,223,884 A | | 12/1940 | Bolan |
| 2,769,620 A | | 11/1956 | Davison |
| 2,856,937 A | | 10/1958 | Harris |
| 2,966,046 A | | 12/1960 | Wright |
| 2,998,714 A | | 9/1961 | Bonzer |
| 3,188,007 A | | 6/1965 | Myklebust |
| 3,699,873 A | * | 10/1972 | Irvin |
| 4,419,300 A | | 12/1983 | VanNess et al. |
| 4,462,304 A | * | 7/1984 | Hashimoto |
| 4,556,521 A | | 12/1985 | Baigas, Jr. |
| 4,723,481 A | * | 2/1988 | Hart et al. |
| 4,851,162 A | | 7/1989 | Sperr, Jr. et al. |
| 4,888,958 A | | 12/1989 | Ella |
| 5,097,672 A | * | 3/1992 | Takenaka et al. .............. 62/186 |
| 5,162,088 A | | 11/1992 | Peng et al. |
| 5,168,722 A | | 12/1992 | Brock |
| 5,192,464 A | | 3/1993 | Pawlowski et al. |
| 5,226,293 A | | 7/1993 | Brock |
| 5,361,600 A | | 11/1994 | Kelley |
| 5,857,350 A | * | 1/1999 | Johnson et al. ............... 62/314 |
| 6,019,679 A | * | 2/2000 | Lloyd |
| 6,101,831 A | * | 8/2000 | Ciccone .................... 62/314 X |

FOREIGN PATENT DOCUMENTS

JP           05099479 A   *   4/1993

* cited by examiner

Primary Examiner—Chen Wen Jiang
(74) Attorney, Agent, or Firm—Gerald E. Helget; Nelson R. Capes; Briggs and Morgan

(57) ABSTRACT

The invention relates to an evaporative cooling device including a stand-alone housing that is not connected to any structure. The housing has at least one vertical side with an opening and an evaporative pad is placed inside the opening. An electric centrifugal blower is placed inside the housing to draw air through the evaporative pad and to discharge the same in a vertical direction through an opening in a top cover. The top cover has a directional spout placed over the opening to direct the air in multi-adjusted directions. The cooling device is intended to be used on wide open playing or sport fields or in open sided warehouses or work stations. A smaller size is intended to be used in semi-confined areas such as verandas, patios, lanais, porches etc. A flexible air duct can be attached to the spout so as to temporarily deliver cooled air to confined spaces such attics in a house. The spout may be adapted to oscillate back and forth to deliver air evenly across a room.

15 Claims, 7 Drawing Sheets

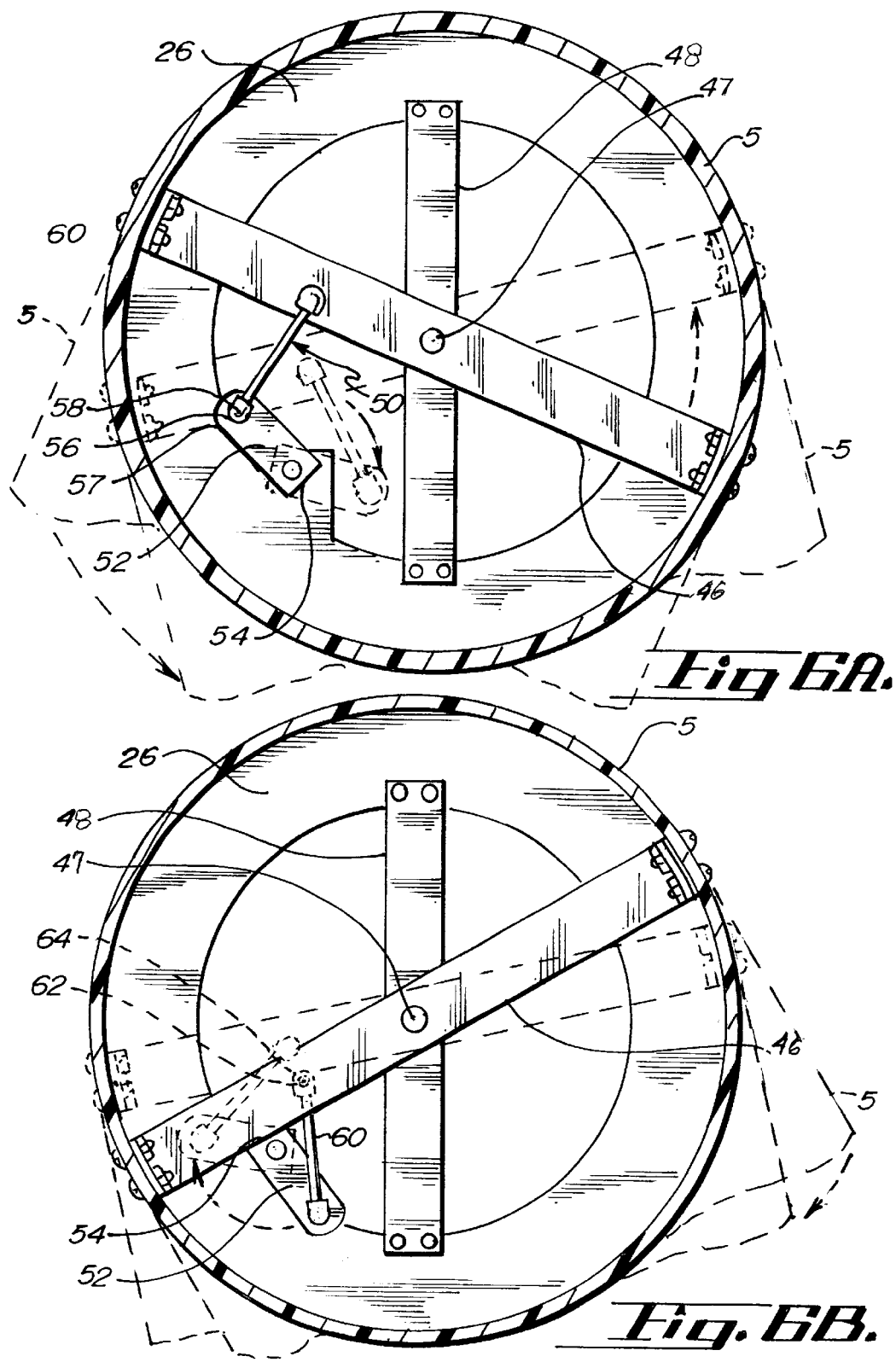

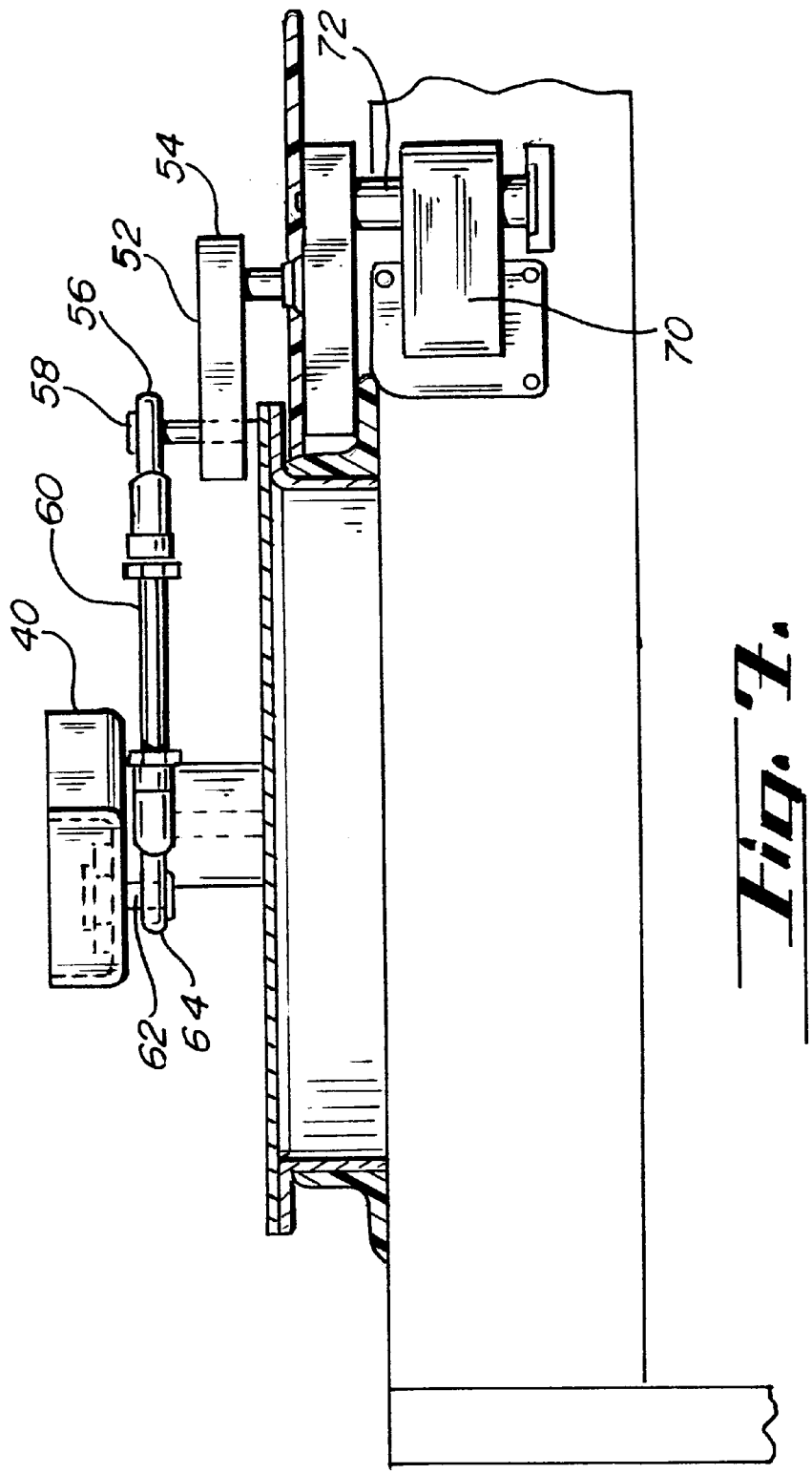

OSCILLATING EVAPORATIVE AIR COOLER

BACKGROUND OF THE INVENTION

The present invention relates to air conditioning devices but more particularly to an evaporative air cooling device having a high speed of air passing through a curtain of water to thereby cool the same.

FIELD OF THE INVENTION

Cooling air by means of evaporative cooling has been utilized for many years. Conventional evaporative cooling devices generally include a housing which may be square or round in which an air moving device such as a motor driven centrifugal blower is mounted to induce a flow of ambient air into the housing through water wetted pads, the air is cooled by the evaporative effect and the air moving device delivers the cooled air to a discharge location. Evaporative coolers of the type described above have found a wide acceptance because of their low initial and operational cost and their effectiveness at least during hot periods of relatively dry or low humidity.

OBJECTS OF THE INVENTION

This device is intended to stand alone to cool open areas that are not enclosed or at least partially enclosed but are otherwise open to the ambient air.

Porches, lanais or so-called Florida rooms during hot and humid days cannot be used because the ambient air under these conditions is very uncomfortable. The same can be said for garages if one wants to work therein.

More open spaces such as patios or terraces are equally effected by heat and humidity and therefore are less desirous to be used because of the comfort level involved.

There are completely open spaces that should be cooled to some extent at selected locations such as warehouses or workstations that are open to the ambient air. Included in this category are sport fields such as football fields, soccer fields or tennis courts. On football fields, for example, it is known to use axial air flow fans to cool the players on the bench simply by blowing air on them and a cooling effect is obtained by the evaporative effect of the perspiration on the players clothing and/or body. It is also contemplated that evaporatively cooled air is to be delivered to confined areas that should be temporarily cooled and no other cooling is available or feasible.

One such area would be an attic of a house where temporary work has to be performed but the heat prevailing in the same on a hot summer day would make such a task prohibitive. The cooling device of the invention would have an adapter so that a flexible length of an air duct could be connected and the cooled air could be delivered to the desired area.

The above objects of the invention are accomplished by presenting a stand-alone unit that is not connected to any type of building structure. The unit is a multi-sided structure by which air will be taken in by all of the sides of the structure into the interior of the structure by a centrifugal blower and then delivered upwardly to a directional spout. All of the sides of the structure have at their openings evaporative water supplied pads for optimum evaporative air flow. The evaporative cooling devices will be made in different sizes dependent on their intended use and application. In smaller units, the blower would have a direct drive electric motor, while in larger units it would be a belt drive electric motor.

In either application, the centrifugal blower is capable of cooling much greater areas due a much greater force of air distribution.

Another object of the present invention is to provide an automatically oscillating spout to deliver air evenly across the room.

Further advantages will become apparent in the description of the invention below.

DESCRIPTION OF THE PRIOR ART

U.S. Pat. No. 5,361,600 to Kelley shows an evaporative cooler that has a multi-sided cabinet with only one evaporative cooling pad contained therein. The multi-sided cabinet creates a tunnel to direct the moving air onto the pad. This is not a stand-alone unit and it is not intended to be so. The cooled air is directed into a confined area below. The unit does show a centrifugal blower to move the air.

U.S. Pat. No. 4,888,958 to Ella shows an evaporative cooling device using axial air flow fans that move the ambient air to evaporative cooling pads and thereafter to a designated location by flexible air ducts. The structure is a stand-alone unit and it can be moved relative to a supporting surface by means of casters.

U.S. Pat. Nos. 5,162,088 and 2,856,937 to Peng et al and Harris, respectively, are stand-alone units that are movable relative to a supporting surface by means of casters. Both Patents show the use of axial air flow fans.

U.S. Pat. No. 2,223,884 to Bolan shows an evaporative cooling unit used on an automobile. There is no driven cooling fan of any kind because the slip stream of the moving automobile creates the air flow through a wetted cooling pad. There is a movable air duct to direct cooled air to a predetermined location.

U.S. Pat. No. 3,188,007 to Myklebust is not an evaporative cooling device because there are no wettable cooling pads at all through which air may flow. It is simply a humidifier. It is a stand-alone structure, it uses a centrifugal air blower and the air is moving in from multi-sides. It does show a movable and directional spout to move air in different directions.

U.S. Pat. No. 5,857,350 to Johnson et al discloses a similar evaporative cooling device. However, the device of the Johnson patent has an unnecessary layer, the pre-filter panel 15, that Applicant has found to be unnecessary for operation. Also, the spout 5 of Johnson does not oscillate as does Applicant's spout.

There are no other known evaporative cooling devices of the invention as claimed.

BRIEF DESCRIPTION OF THE DRAWINGS

FIG. 6A is a detailed cross-section of the device of the present invention, taken at approximately the lines 6 of FIG. 1, showing the operation of the oscillating mechanism;

FIG. 6B is the same as FIG. 6A, with the oscillating mechanism in a second position; and FIG. 7 is a cross-section of the device of the present invention, showing attachment of the oscillating mechanism to an electric motor.

DETAILED DESCRIPTION OF THE PREFERRED EMBODIMENT

Figure 1:
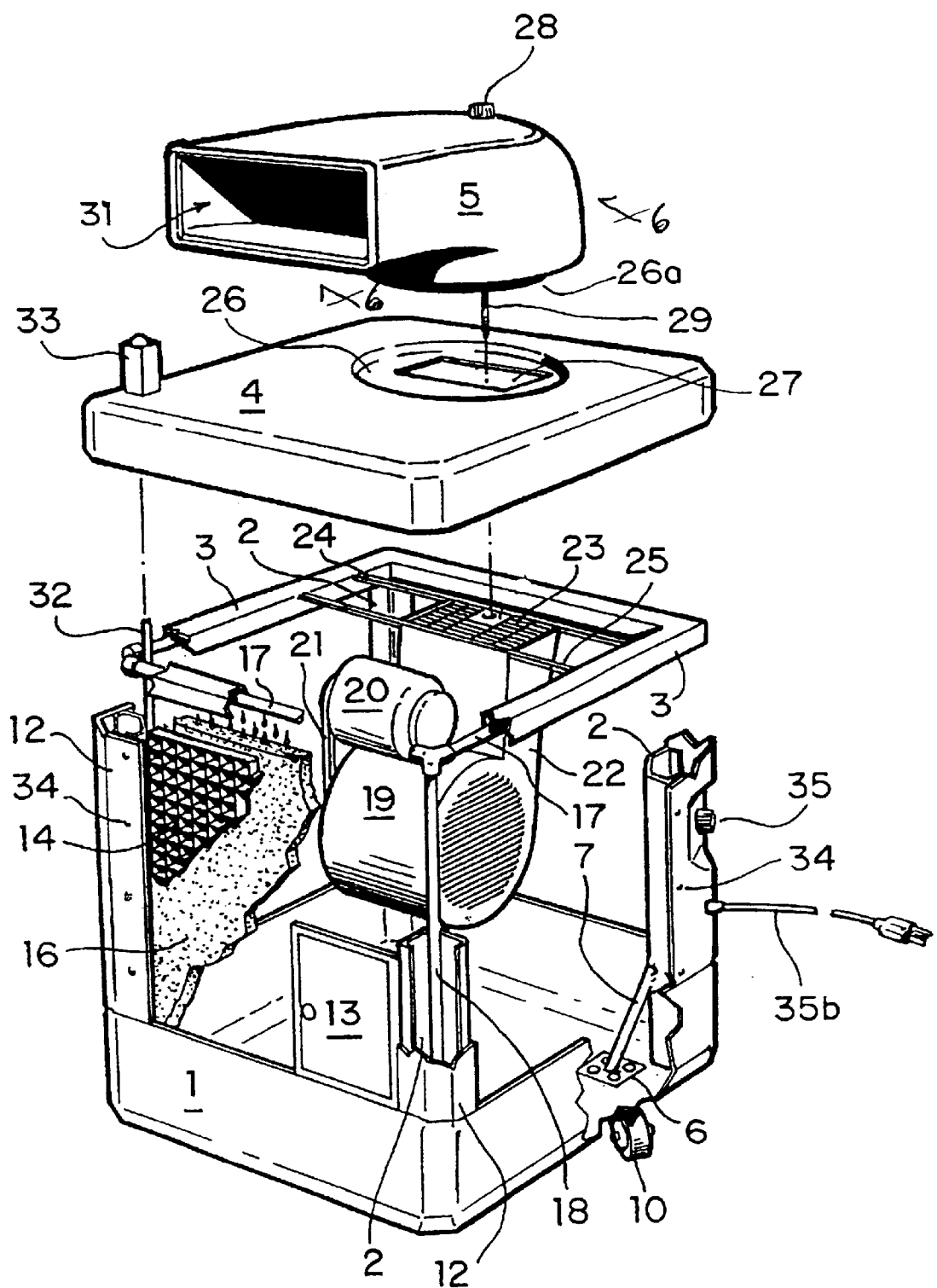
FIG. 1 shows a perspective and an exploded view of the evaporative cooling device.

FIG. 1, as stated above, shows a perspective and an exploded view of the evaporative cooling device of the invention. As can be seen the device consists of a four-sided structure in the form of a cabinet. The structure does not have to be four-sided but could instead consist of a triangle all the way up to the shape of a pentagon or an octagon. However, a square configuration is preferred because of its simplicity of construction and its efficiency of operation. A triangular configuration would not deliver the magnitude of the airflow contemplated by this invention. A configuration of more sides than four would satisfy the required magnitude of the airflow but the cost of construction would not satisfy the relative low price contemplated by this invention experiments have shown that more sides than four will not add to the efficiency of the device.

As can be seen in FIG. 1, the structure in its horizontal plane has the shape of a square and there is a sump 1 in the bottom of the device.

The sump 1 is made of an ABS plastic material to avoid corrosion because it is in constant contact with water. Connected to the sump 1 are four upright or vertical supports 2 which are of a channel shaped configuration in the form of a pentagon, although other shapes can be used. The channels are formed into their shapes by bending or they can be extruded. It is important that they are shape-locked or made rigid by their shape because they transfer strength to the basic structure of the cabinet because of the load they have to carry. Connected to the top ends of the vertical supports are horizontal braces 3 which are channels open at their bottoms the purpose of which will be explained below. The square configuration of braces 3 will receive a top cover 4, also made of an ABS plastic material so as to be corrosion resistant. A directional spout 5 is attached to the cover 4 and fastened in a way to be explained below. To complete the structure of the cabinet and its sturdiness, reinforcing plates 6 are attached to all four corners of the sump 1. The plates are further reinforced by upwardly extending braces 7 which are attached by welding to the plates 6 and then to the corner vertical supports 2 by either welding or by bolts or rivets. Since the sump 1 will contain water, the water is supplied by a coupling (not shown) through a hose 9. One of the objects indicated above, has been that the unit, structure or cabinet be free standing and be movable. Therefore, casters 10 are provided to render the structure movable relative a support surface.

There are corner covers 12, also made of a corrosion resistant ABS plastic material, which are fastened to the channel-shaped vertical supports 2 by either rivets or bolts 34. As can be seen now, the structure or the cabinet now has large openings on all of its four sides. The openings are now provided with the necessary elements to make it into an evaporative cooling device. To this end, panels are provided and removably fastened in the openings. A high efficiency evaporative pad 16 is placed innermost in the opening and it is constantly wetted by water drip pipes 17 placed on top of each panel.

The water drip pipes are placed in the horizontal channels 3 which are open at their bottoms, as explained above, so that the drip pipes 17 are concealed therein but at the same time can execute their function and that is to deliver water to the top of the evaporative panels 16 so that water can thoroughly wet the same by gravity flowing downwardly.

Finally, there is an outer plastic honeycomb panel 14 closing off the opening. While this is not exactly essential, it protects the inner panels from damage and lends an aesthetic appearance to the overall structure.

Returning to the sump 1 in the bottom of the structure or the cabinet, there is a water hose connection 8 for the supply of water through water hose 9. At this point it should be stated that in most devices, the water sump 1 is large enough to hold water of sufficient volume for an operation of up to eight hours so that the water supply hose 9 does not have to continuously stay connected to assure an extended cooling operation. This feature makes the device a truly stand-alone unit. In order to make the unit movable relative to a supporting surface, casters 10 are provided on all four corners which are fastened to support plates 6. To finish the structure or cabinet and to give it an attractive appearance, corner covers 12 are provided on all four corners and they are fastened to the vertical supports 2 by way screws or rivets 34. An access door 13 is provided through the sandwich of evaporation pad 16, and the outer honeycomb cover 14 so that access can be had through the sandwich to the interior of the device to gain access to the drain plug 43 (FIG. 4) or to place a block of ice therein during extreme temperature conditions.

Water drip pipes 17 are placed within the open bottom channels 3 so that they are concealed therein, whereby the dripping water will wet the evaporative pads and will flow downwardly by gravity and any excess water will return into the sump 1. Water is supplied to drip pipes 17 by vertical water delivery pipes 18, as will be explained in more detail below.

There is a centrifugal blower 19 which draws air into the interior of the device from all four sides. The blower is driven by an electric motor 20 and by belt or belts 21. A belt drive 17 is preferred in larger units that are used in wide open areas.

The centrifugal blower is contained in housing 22 which housing 22 has an exit at 23. The housing 22 with its exit 23 is supported by braces 24 and 25 at an upper end of the structure or cabinet.

The top cover 4 has a circular recess 26 which matches the lower ring 26a of the top cover 4. This enables the spout 5 to be rotatable relative to the cover 4. The exit 23 of housing 22 matches the rectangular opening 27 in the top cover 4 so as to be connected thereto in an air-tight manner.

It is desirable that the spout be arrested in any of its rotatable positions.

To this end, there is an adjusting knob 28 at the top of the spout 5 which knob in turn is fastened to screw threaded bolt 29. The screw threaded bolt 29 is received in a Nylon lock nut which is fastened by brackets in the opening 23. In this manner, when the knob 28 is turned in a clock-wise fashion, the spout 5 with its ring 26a is arrested within the circular recess 26 of the top cover 4. This arrangement assures that the spout stays in its adjusted direction because any vibrations cannot jar loose the clamping effect.

It is desirable, at any time, to quickly ascertain the water level in the sump when the device is used as a stand-alone unit and is not connected to water supply hose 9. There is a float rod 32 which has at its bottom a float ball 32a (FIG. 3) and the float rod extends into the water level indicator 33 which is mounted on top of cover 4. The float ball 32a rides on top of the water level in sump 1 and as it rises or lowers the float rod 32 follows the movement of the float ball 32a and such a movement is indicated at the water level indicator 33.

Finally, there is a six-position switch 35 mounted on one of the plastic corner covers 12, the function of which will be explained below with reference to FIG. 5.

Figure 2:
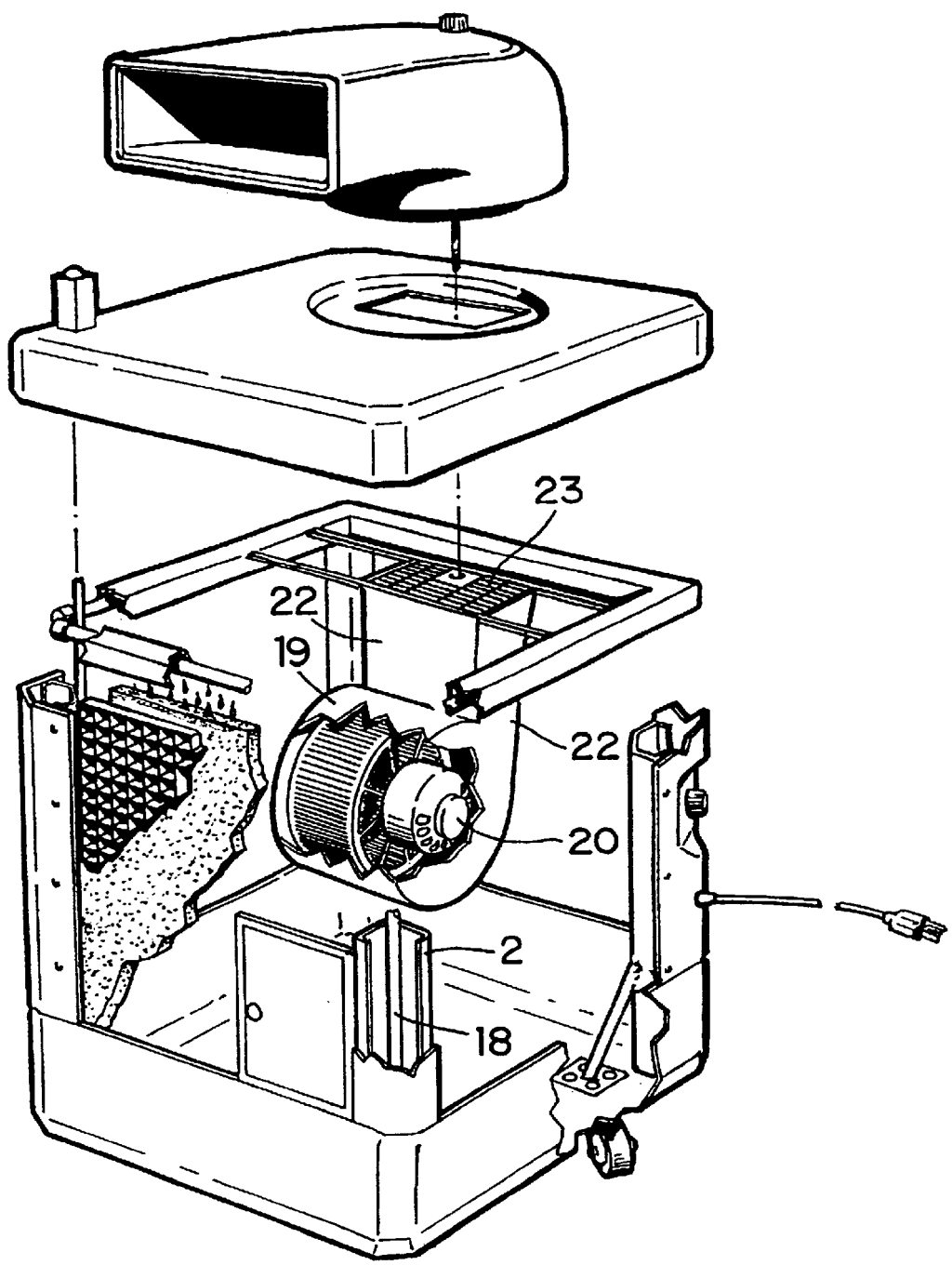
FIG. 2 shows the same view as in FIG. 1 but with a different drive system.

Reference is now being made to FIG. 2 wherein like reference characters have been applied to the same elements as shown in FIG. 1. The only difference from FIG. 1 in FIG. 2 is that the drive motor 20 driving the blower 19 is a direct drive motor to thereby eliminate the belt or belts 21. This kind of a drive is preferred in smaller devices or cabinets that should be used in semi-enclosed structures such as porches, lanais, garages etc.

Figure 3:
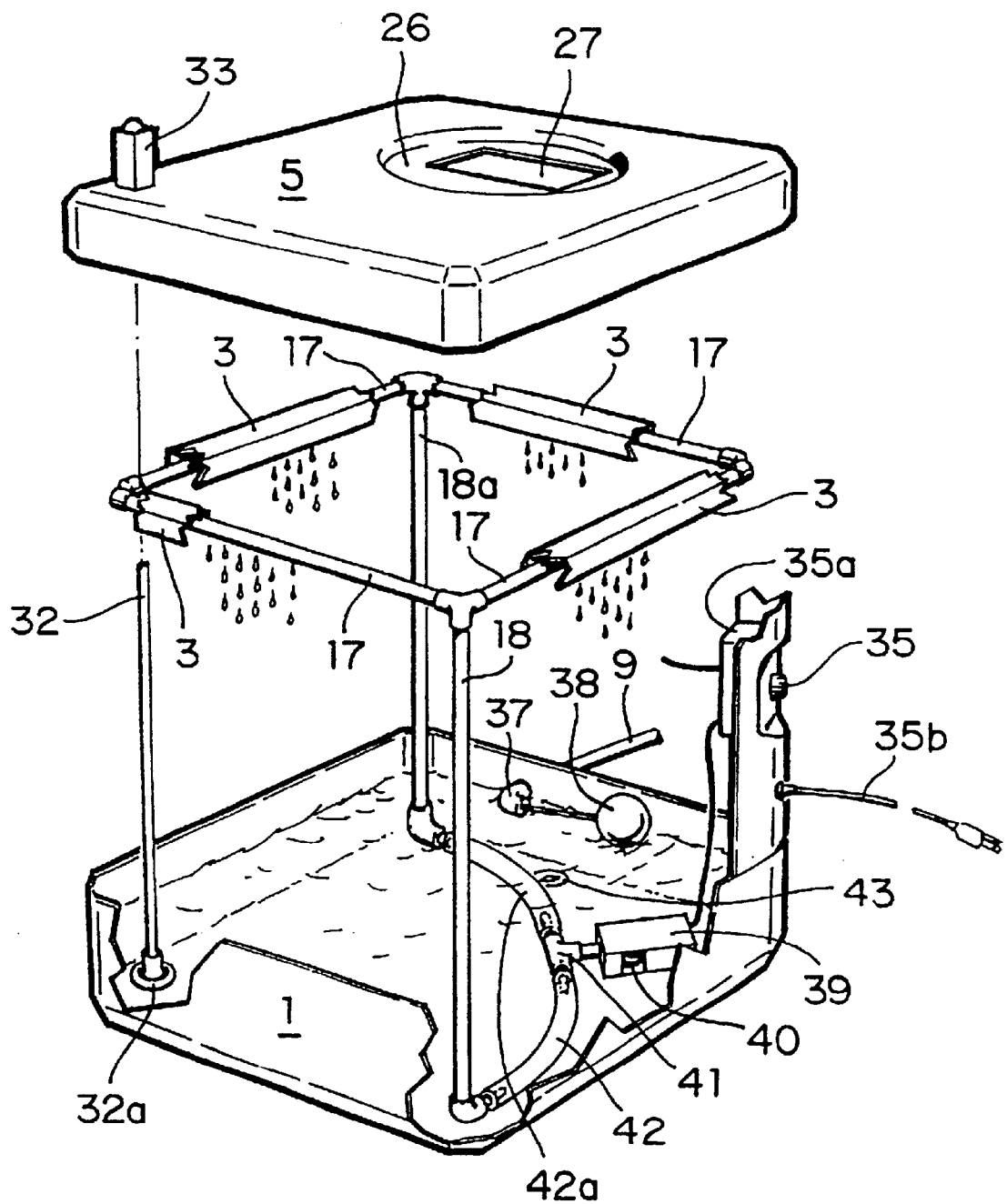
FIG. 3 shows a more detailed view of the interior of the cooling system of the invention.

FIG. 3 is a perspective and an exploded view of the evaporative cooling device which allows a more detailed view of the interior of the device.

Like reference characters have been applied in this view to the same elements as can be found in FIGS. 1 and 2. There is a water connection (not shown) which is connected to the water hose 9. The water connection leads into a water shut-off device 37. The water shut-off device is intended to shut off the water supply to the sump 1 when a maximum of water is detected within the sump. This detection is accomplished by the float ball 38.

There is also a sump pump 39 which supplies water to drip pipes 17 within the channels 3. The sump pump 39 has a float 40 which controls the operation of the pump 39 when a minimum of the water level in sump 1 has been detected. When the pump 39 is in operation, the pumped water from the pump exits into a divider tee 41 which directs water to two diagonally placed vertical water supply pipes 18 and 18a by way of water hoses 41 and 42.

With reference to FIG. 1, it has been indicated that there is a six-position rotary switch 35 mounted on one of the corner covers 12. In FIG. 3 it can be seen that the rotary switch 35 is connected to switch housing interiorly of the corner cover 12. A power line 35b leads into the housing. The various positions and functions of the switch 35 are shown in FIG. 5.

Figure 4:
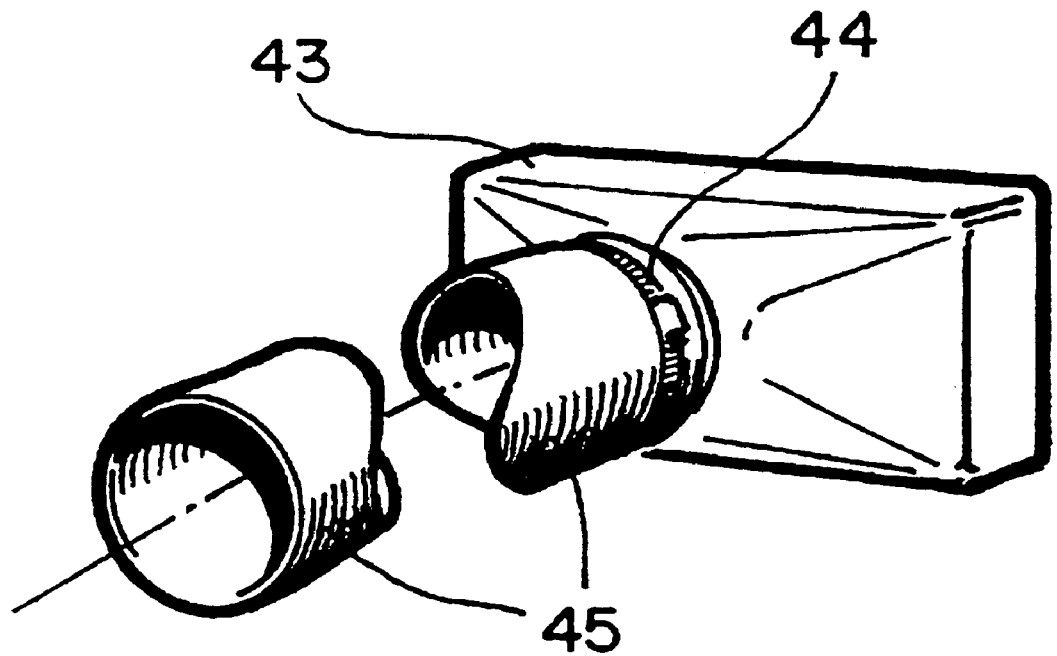
FIG. 4 shows an adapter with a flexible air duct attached thereto.

FIG. 4 shows a further development of the invention wherein the evaporatively cooled air can be directed to specifically enclosed areas, such as when working in an attic, and of course other areas, on a temporary basis. This is accomplished by providing an adapter 43 which fits over the opening 31 of spout 5. As can be seen the rectangular opening 31 is converted into a round opening to accommodate a circular and flexible air duct 45. The air duct 45 is fastened to the adapter 43 by means of a well known clamping ring 44.

Figure 5:
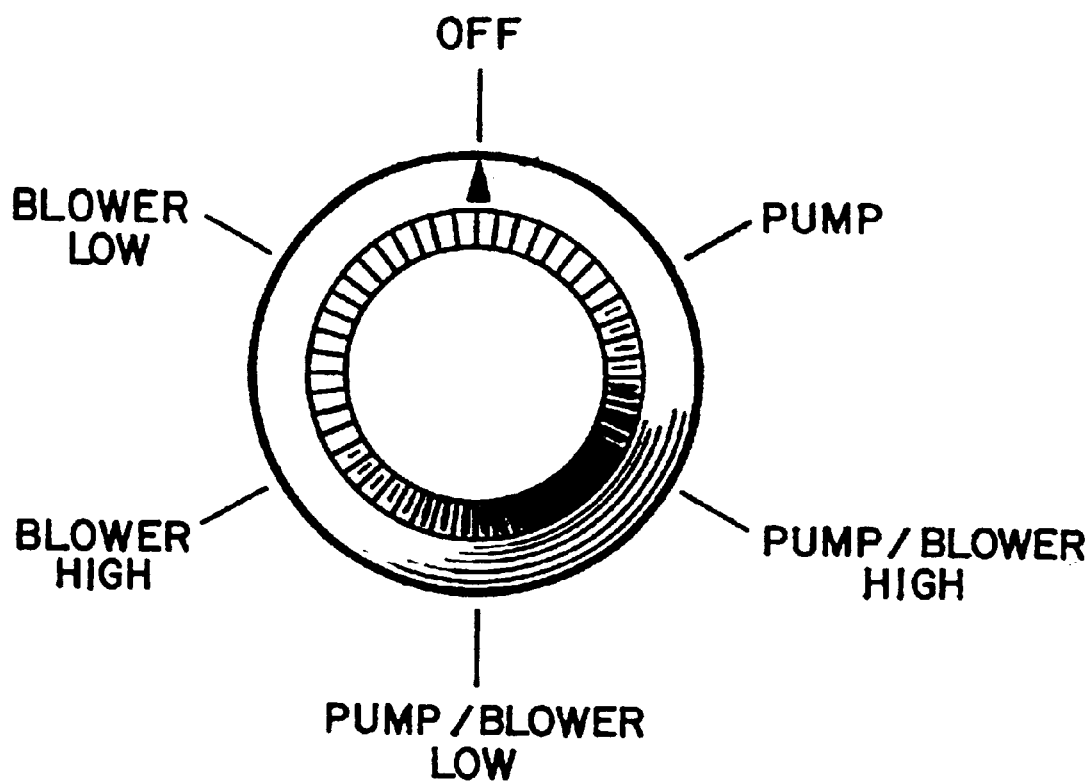
FIG. 5 shows a rotary six-position electric switch.

The rotary switch in FIG. 5, seems to be self-explanatory. At the 12 o'clock position, there is the system OFF position. The 2 o'clock position operates the pump only. This is desirable when a pre-wetting of the evaporative pads is preferred. The pump and blower high speed position is called for under extreme temperature and humidity conditions, while the 6 o'clock position will suffice under low humidity and/or temperature conditions. The 8 o'clock position is used to dry the evaporative pads after a shut-down of the device and when high humidity conditions are prevailing. While the 10 o'clock position is desired when the system is shut-down and a drying of the pads is easily accomplished when the ambient air humidity is low. A drying of the evaporative pads after the system has shut down is highly desirable because any moisture inherently remaining in the pads will lead to undesirable formations of mold or formations formed by calcium deposits which tend to clog the open spaces within the evaporative pads.

In a second embodiment of the present invention, the spout 5 is attached to the rest of the device in such a manner that the spout 5 oscillates alternatively counterclockwise and clockwise about an axis defined by the threaded bolt 29.

In the second embodiment, shown in FIGS. 6A and 6B, the spout 5 is attached to cross member 46. In turn, cross member 46 is pivotally connected to the threaded bolt 29. Threaded bolt 29 passes through aperture 47 and then threadingly engages cross strut 48.

A linkage 50 is attached, preferably to the circular recess 26. The linkage 50 comprises a rotating block 52 which is connected at a first end 54 to an oscillating electric motor 70 by its shaft 72. As the shaft 72 rotates, the rotating block 52 moves clockwise in the direction indicated by the small arrow in FIG. 6A.

A socket 56 is formed in the second end 57 of the rotating block 52. A ball 58 is loosely engaged in the socket 56 so that the ball may move in three axes of rotation. Connected to the ball 58 is the rod 60. The rod 60 is also connected to secondary ball 62 at the other end of the rod, and the secondary ball 62 rotates freely in the secondary socket 64. Socket 64 is securely attached to the cross member 46 at a point displaced from the threaded rod 29, the axis of rotation of the spout 5.

As seen in FIGS. 6A and 6B, as the rotating block 52 rotates in the direction shown by the arrow, the rod 60 will rotate freely in the socket 56 and secondary socket 64, moving from the position shown in FIG. 6A to that shown in phantom FIG. 6A. As it does so, the rod 60 will cause the spout 5 to rotate about the threaded rod 29, between the positions shown in phantom lines in FIG. 6A. As the rotating block 52 continues to rotate, the rod will cause the spout 5 to rotate back as shown in FIG. 6B, and so forth.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An evaporative stand-alone cooling device comprising:
   (a) a housing having at least one open vertical side including a wettable evaporative pad placed in an opening of said open vertical side;
   (b) means for delivering water to a top of said evaporative pad to flow downwardly through said pad by gravity;
   (c) a sump located at the bottom of said housing to collect excess water therein from said evaporative pad;
   (d) a pump placed in said sump being the said means for delivering water to the top of said pad;
   (e) said housing further including a centrifugal blower being driven by an electric motor, said blower being mounted in said housing so as to create a positive pressure of vertically flowing air while at the same time creating a negative pressure of laterally flowing air through said evaporative pad;
   (f) said housing further including a cover at its top having an opening to accommodate said vertically flowing air;
   (g) an oscillating, rotatable spout being placed over said opening to direct air in multiple directions; and
   (h) further comprising a second electric motor and a linkage between said second electric motor and said oscillating, rotatable spout, said linkage being adapted to rotate said oscillating rotatable spout alternatively clockwise and counterclockwise, wherein said linkage further comprises a rotating block having a first end and a second end and being connected to said second electric motor at said first end, a socket formed in said second end, a ball loosely engaged in said socket, a rod connected to said ball at a first end of said rod, the second end of said rod being connected to a secondary ball loosely engaged in a secondary socket, said secondary socket being attached to a cross member, said cross member being attached to said oscillating, rotatable spout, wherein said linkage is enclosed within said oscillating, rotatable spout.

2. The evaporative cooling device of claim 1, further comprising a float located in said sump to detect a minimum level of water in said sump to stop said pump.

3. The evaporative cooling device of claim 1, wherein each of said evaporative pads is of a sandwich construction consisting of said evaporative pad being placed innermost in each of said open vertical sides and a grid being placed most outwardly in said open vertical sides to protect said evaporative pad from damage and to enhance the aesthetic appearance of the housing.

4. The evaporative cooling device of claim 1, wherein the electric motor is a direct drive motor.

5. The evaporative cooling device of claim 1, wherein the electric motor is a belt drive motor.

6. The evaporative cooling device of claim 1 including a water connection in said sump for delivering water into said sump.

7. The evaporative cooling device of claim 6 wherein said water connection is connected to a water valve device including a float to detect a maximum of water level in said sump to shut off the water valve.

8. The evaporative cooling device of claim 1, wherein a drainage plug is provided in the bottom of said sump.

9. The evaporative cooling device of claim 1, wherein a movable access door is provided in said evaporative pad to be able to gain access to the interior of said housing.

10. The evaporative cooling device of claim 1, wherein vertical supports are placed in each corner of said multi-sided housing and wherein the tops of said supports are connected by channel braces open at their bottom and water dripping pipes are placed and concealed within said channels.

11. The evaporative cooling device of claim 1, wherein said spout has a circular bottom ring and said top cover has a circular recess receiving said ring including means for clamping said spout and said top cover in any adjusted rotational position.

12. The evaporative cooling device of claim 11, wherein said means for clamping consists of a knob at the top of said spout being connected to a downwardly extending threaded bolt the end of which is being received in a NYLON lock nut having been mounted in the top of said housing.

13. The evaporative cooling device of claim 1, wherein said spout has a rectangular opening and an adapter placed over said opening to convert the same to a circular opening including a circular and flexible air duct attached to said circular opening.

14. The evaporative cooling device of claim 1 including an electric rotary switch mounted on said housing to control the speed of said pump and said blower singly or in combination.

15. The evaporative cooling device of claim 1 including casters placed at the bottom of said housing to enable the housing to be moved relative to a supporting surface.

\* \* \* \* \*